United States Patent Office 3,030,200
Patented Apr. 17, 1962

3,030,200
CONTINUOUS MANUFACTURE OF A PHOSPHORIC AND SULPHURIC ACID MIXTURE
George Jordan Harris, Beloeil Station, Quebec, Canada, assignor to Canadian Industries Limited, Montreal, Quebec, Canada, a corporation of Canada
No Drawing. Filed July 6, 1959, Ser. No. 824,920
Claims priority, application Canada Oct. 16, 1958
6 Claims. (Cl. 71—37)

This invention relates to the continuous manufacture of a mixture of phosphoric and sulphuric acids, and more particularly to the manufacture of an acid mixture suitable for making enriched superphosphate fertilizer.

In the manufacture of fertilizer from phosphate rock, it is common practice to acidulate the rock with a controlled amount of sulphuric acid of about 70% concentration, the product, when suitably cured, being known as single or normal superphosphate fertilizer. Such superphosphate normally contains between 18% and 21% of agronomically available phosphorus (expressed as $P_2O_5$), depending on the grade of rock used in its manufacture.

For some time, the trend in the manufacture of compound fertilizers has been towards grades containing a higher percentage of available phosphorus, and these grades may be suitably made from the so-called triple superphosphate, where the available $P_2O_5$ content may be from 43% to 50%. This triple superphosphate is made by acidulating phosphate rock not with sulphuric acid, but with phosphoric acid of between 65% and 80% concentration.

There are two usual methods for manufacturing phosphoric acid: the so-called wet process and furnace methods. The first of these normally comprises treating phosphate rock with sulphuric acid to yield calcium sulphate and phosphoric acid. However, it has hitherto not been possible to produce by this method a phosphoric acid containing more than 28–32% $P_2O_5$, i.e. a 39% to 44% phosphoric acid solution. This limit is imposed by the desirability of precipitating calcium sulphate in a filterable form, and the process and its limitation have been extensively discussed (see for example Kirk-Other, Encyclopedia of Chemical Technology, vol. 6, pp. 414 et seq.). Thus, in order to make triple superphosphate using wet process acid, it is necessary to concentrate the acid to at least 65% concentration, which is an expensive operation not only because of the heat required, but also due to corrosion problems, and the high capital investment required.

The furnace method of manufacturing phosphoric acid is, due to its expense, only largely used for food grade phosphoric acid. The method comprises the fusion and reduction of phosphate rock, normally in an electric furnace, to volatilize elemental phosphorus, and the subsequent combustion of the phosphorus to $P_2O_5$ and the solution of this oxide in water. Again considerable corrosion problems are encountered.

Now, because of the expense of producing strong phosphoric acid by either of these methods, the available phosphorus in triple superphosphate is more expensive, per unit of available $P_2O_5$, than that in normal superphosphate. Thus, it is common practice to mix triple superphosphate with normal superphosphate and other materials to produce mixed fertilizer. A typical 10—10—10 grade mixed fertilizer is made from:

| | Parts by weight |
|---|---|
| Single superphosphate | 1800 |
| Triple superphosphate | 558 |
| KCl | 1027 |
| $(NH_4)_2SO_4$ | 2462 |
| Ammoniating solution (49% $N_2$) | 207 |

It has now been discovered that gaseous sulphur trioxide may be efficiently absorbed in strong mixtures of sulphuric and phosphoric acids, and that, by a judicious choice of conditions, a concentrated mixture of sulphuric and phosphoric acids may be continuously produced from gaseous sulphur trioxide and wet-process phosphoric acid (about 43% $H_3PO_4$). Said concentrated mixture of sulphuric and phosphoric acids may be diluted with more wet-process phosphoric acid to produce a mixture containing about 70% total acid, and this mixture can be reacted with phosphate rock to produce a superphosphate of about 29% available $P_2O_5$. This enriched superphosphate may then be used to produce a 10—10—10 mixed fertilizer fully equivalent to that made from triple superphosphate in the following manner:

| | Parts by weight |
|---|---|
| Single superphosphate | 848 |
| Enriched superphosphate | 1510 |
| KCl | 1027 |
| $(NH_4)_2SO_4$ | 2462 |
| Ammoniating solution (49% $N_2$) | 207 |

It is thus an object of this invention to produce continuously from gaseous sulphur trioxide and wet-process phosphoric acid a strong mixture of sulphuric and phosphoric acids.

A further object of this invention is to produce from wet-process phosphoric acid an acid mixture suitable for the manufacture of 29% superphosphate, without the need for concentrating said wet-process phosphoric acid by expensive evaporative methods as is usual in the triple superphosphate process.

Further objects will appear hereinafter.

It is well known that gaseous sulphur trioxide cannot be dissolved directly in wet-process (43%) phosphoric acid, for the result is a dense and persistent sulphuric acid fog which cannot be economically recovered.

This difficulty is overcome and the objects of this invention are accomplished by absorbing gaseous sulphur trioxide in a strong solution of sulphuric and phosphoric acids containing not more than 5.0% by weight of water, separating a portion of the resultant sulphur trioxide-enriched acid solution as product, diluting the remainder with a phosphoric acid solution and recirculating to the absorption stage. As an additional step the product acid may be diluted with a phosphoric acid solution and the resulting mixture used in the production of soluble fertilizing material. In addition to their use in the production of enriched superphosphate, the acid mixtures produced by the process of this invention may be ammoniated to give fertilizing materials not otherwise obtainable from wet-process phosphoric acid and concentrated sulphuric acid without prior evaporation of said wet-process acid.

Having thus defined the invention, it will be better illustrated by the following examples. The percentages and strengths given therein are purely exemplary and the invention is to be limited only by the appended claims.

EXAMPLE I

A mixture of sulphur trioxide and nitrogen gases was passed upwards through 900 g. of mixed concentrated sulphuric and C.P. phosphoric acids contained in a column of 1¾" bore. The percentage of absorption was measured by analysing the gas leaving the column for $SO_3$ and $H_2SO_4$ mist. The results are given in Table I.

*Table 1*

PERCENTAGE ABSORPTION OF $SO_3$ IN $H_2SO_4/H_3PO_4$ MIXTURES AT 60°C.

| Acid Composition | | | Percent $SO_3$ in feed gas (by volume) | Gas Rate, ltr./hr. | Percentage Absorption (mean value) |
| --- | --- | --- | --- | --- | --- |
| $H_2SO_4$ | $H_3PO_4$ | $H_2O$ | | | |
| 98.3 |  | 1.7 | 11.1 | 13.5 | 99.95 |
| 85.8 | 13.8 | 0.4 | 13.2 | 18.1 | 99.95 |
| 84.9 | 14.4 | 0.7 | 13.6 | 26.1 | 99.9 |
| 85.9 | 13.1 | 1.0 | 14.3 | 21.6 | 99.9 |
| 85.3 | 13.7 | 1.0 | 13.2 | 17.6 | 99.9 |
| 78.9 | 16.4 | 4.7 | 11.3 | 13.3 | 98.0 |
| 80.3 | 13.5 | 6.2 | 13.2 | 18.1 | 96.5 |
| 77.2 | 14.2 | 8.6 | 12.0 | 11.0 | 95.0 |

It can be seen that the absorption was efficient at less than about 5.0% of water, but that at higher water concentration the efficiency fell off rapidly, and a sulphuric acid fog began to appear in the off-gas. No lower limit can be set on the water concentration for even at 0% water, $SO_3$ still dissolves to give (presumably) oleum, and even after dilution with a suitable amount of make-up dilute phosphoric acid the water concentration could still be zero. It is possible to run the cycle so that the absorption takes place on the $SO_3$-rich side (with no free water present) and the formation of sulphuric acid occurs in the dilution stage. However, the absorption rapidly becomes inefficient due to the increased vapour pressure of $SO_3$ over the oleum-containing mixture.

EXAMPLE II

When 43% wet-process phosphoric acid was used as the make-up which was added to the recycled acid solution in the process of this invention, the acid resulting from the absorption process had the approximate composition 86.1% $H_2SO_4$, 12.9% $H_3PO_4$, about 1% water.

The product portion of the above acid was diluted with further 43% wet-process phosphoric acid to give a solution containing about 30% water, 41.6% $H_2SO_4$, 28.4% $H_3PO_4$. There was some difficulty in analysing for water due to the impurities present in wet-process acid. The heat of dilution raised the temperature of the acid mixture to about 180° F. and to 106 g. of this mixture was added 100 g. of phosphate rock, and the resultant material was stirred for two minutes, and allowed to set. The product after curing analysed 29% citrate soluble $P_2O_5$ (A.O.A.C. test). It is known in the art that a suitable acid mixture for acidulating phosphate rock contains about 30% of water. More water gives a sticky product, and in the process of this invention, less water gives a lower soluble $P_2O_5$ content due to less wet-process phosphoric acid used in dilution.

What I claim is:

1. A process for the continuous production of a concentrated mixture of sulphuric and phosphoric acids from sulphur trioxide and an aqueous phosphoric acid solution, which process is characterized by the absence of sulphuric acid mist and comprises adding said phosphoric acid solution to a concentrated sulphuric acid-phosphoric acid mixture so as to provide not more than 5% by weight of water in the resulting solution, contacting said resulting solution with gaseous sulphur trioxide whereby the sulphur trioxide reacts with at least part of the water in said solution to form sulphuric acid, separating as product a portion of the enriched concentrated mixture of sulphuric and phosphoric acids and recycling the remaining strong acid portion to the phosphoric acid solution addition stage.

2. A process for the continuous production of a concentrated mixture of sulphuric and phosphoric acids from sulphur trioxide and wet-process phosphoric acid, which process is characterized by the absence of sulphuric acid mist and comprises adding said wet-process phosphoric acid to a concentrated acid mixture containing from 79% to 86% by weight of sulphuric acid and from 13% to 15% by weight of phosphoric acid so as to provide not more than 5% by weight of water in the resulting solution, contacting said resulting solution with gaseous sulphur trioxide whereby the sulphur trioxide reacts with at least part of the water in said solution to form sulphuric acid, separating as product a portion of the enriched concentrated mixture of sulphuric and phosphoric acids, and recycling the remaining strong acid portion to the wet-process phosphoric acid addition stage.

3. A process as claimed in claim 1 wherein the separated product is diluted with a phosphoric acid solution so as to yield a mixture containing about 30% by weight of water and the said mixture is thereafter reacted with phosphate rock to yield a fertilizing material.

4. A process as claimed in claim 1 wherein the phosphoric acid solution is added in such an amount as to provide an absorbing acid containing from 0.4% to 1.0% by weight of water.

5. A process as claimed in claim 2 wherein the separated product is diluted with wet-process phosphoric acid to about 30% by weight of water and the diluted mixture is thereafter reacted with phosphate rock to yield a fertilizing material containing about 29% citrate soluble $P_2O_5$.

6. A process as claimed in claim 2 wherein the wet-process phosphoric acid is added in such an amount as to provide an absorbing acid containing about 86% by weight of sulphuric acid, about 13% by weight of phosphoric acid and about 1% by weight of water.

References Cited in the file of this patent
UNITED STATES PATENTS

| | | |
| --- | --- | --- |
| 2,053,834 | Kachkaroff et al. | Sept. 8, 1936 |
| 2,899,271 | Miche | Aug. 11, 1959 |